(12) United States Patent
Yen et al.

(10) Patent No.: US 11,336,166 B2
(45) Date of Patent: May 17, 2022

(54) MOTOR AND DRIVE CIRCUIT AND DRIVING METHOD THE SAME

(71) Applicant: Tensor Tech Co., Ltd., Taipei (TW)

(72) Inventors: Po-Hsun Yen, Chiayi (TW);
Shang-Jung Lee, Chiayi (TW);
Yung-Cheng Chang, Chiayi (TW);
Sung-Liang Hou, Chiayi (TW)

(73) Assignee: Tensor Tech Co., Ltd., Taipei (TW)

( * ) Notice: Subject to any disclaimer, the term of this patent is extended or adjusted under 35 U.S.C. 154(b) by 410 days.

(21) Appl. No.: 16/594,195

(22) Filed: Oct. 7, 2019

(65) Prior Publication Data

US 2021/0050767 A1 Feb. 18, 2021

(30) Foreign Application Priority Data

Aug. 14, 2019 (TW) .................................. 108128949

(51) Int. Cl.

| | |
|---|---|
| *H02K 17/08* | (2006.01) |
| *H02K 41/06* | (2006.01) |
| *H02K 3/26* | (2006.01) |
| *H02K 7/08* | (2006.01) |
| *H02K 11/33* | (2016.01) |
| *H02P 6/17* | (2016.01) |
| *H02P 6/30* | (2016.01) |
| *H02K 11/215* | (2016.01) |

(52) U.S. Cl.
CPC ............. *H02K 41/065* (2013.01); *H02K 3/26* (2013.01); *H02K 7/08* (2013.01); *H02K 11/215* (2016.01); *H02K 11/33* (2016.01); *H02P 6/17* (2016.02); *H02P 6/30* (2016.02); *H02K 2203/03* (2013.01)

(58) Field of Classification Search
CPC ....... H02K 41/065; H02K 16/04; H02K 7/088; H02K 7/08; H02K 2201/18
See application file for complete search history.

(56) References Cited

U.S. PATENT DOCUMENTS

| | | | | |
|---|---|---|---|---|
| 4,874,998 | A * | 10/1989 | Hollis, Jr. .................. | B25J 9/12 318/568.21 |
| 6,127,762 | A * | 10/2000 | Pedlar ..................... | G01C 19/06 310/216.066 |
| 6,879,076 | B2 * | 4/2005 | Long ........................ | H02K 1/02 310/156.38 |
| 7,675,208 | B2 * | 3/2010 | Bandera ................... | H02K 7/14 310/80 |
| 10,211,708 | B2 * | 2/2019 | Williamson ........... | H02K 21/14 |
| 10,819,183 | B1 * | 10/2020 | Kothandaraman .. | B25J 17/0266 |

* cited by examiner

*Primary Examiner* — Dang D Le
(74) *Attorney, Agent, or Firm* — Karin L. Williams; Alan D. Kamrath; Mayer & Williams PC (57) ABSTRACT

A motor includes a stator with a first stator, a second stator, and a third stator, each including at least one stator coil, and a rotor including a magnetic element, a first bearing, a second bearing, and a shaft, the stators generating a superimposed magnetic field together causing the magnetic element to rotate. When the magnetic element rotates in the first plane, the outer ring of the first bearing rotates. The center of the first bearing is located in a plane where the second bearing is located, and when the magnetic element rotates in the second plane, the inner ring of the second bearing rotates. A central axis of the shaft passes through the center of the first bearing; wherein the shaft is rotatably fixed to the first bearing and connected to the second bearing.

20 Claims, 9 Drawing Sheets

MOTOR AND DRIVE CIRCUIT AND DRIVING METHOD THE SAME

BACKGROUND OF THE INVENTION

1. Technical Field

This disclosure relates to a motor and a drive circuit and driving method of the same, in particular to a ball motor that can perform control in more than two dimensions without configuring actuators or drive components for each dimension, and a drive circuit and driving method of the motor.

2. Description of Related Art

"Force" is a vector, and the transmission direction of the force is traditionally changed by means of components such as pulleys, gears, screws, cams, or connecting rods, or the combination of these components.

With the advances of technology, the combination of multiple actuators or drives and the force applied to the proper position and in the proper direction are generally necessary to realize the operation of precision machines (such as small satellites, robotic arms) in multiple dimensions.

However, traditional power units, such as motors, can only provide power in one dimension. Therefore, it is necessary to configure multiple motors to complete multi-dimensional operation of precision machines, which makes the machines heavy.

As the total weight of the machines increases, more energy is required for the operation or execution of the machines, and energy consumption increases. In addition, more components mean that the manufacture of machines has a greater burden on the environment accordingly.

Energy issues and environmental issues are now drawing more and more attention. Therefore, how to enable motors to provide power in multiple dimensions to reduce the weight of machines, reduce power consumption, and reduce material consumption so as to reduce environmental burden has become an important issue.

BRIEF SUMMARY OF THE INVENTION

In order to settle the above-mentioned issues, this disclosure provides a motor and a driving method of the same. The motor in this disclosure comprises stators and a rotor, wherein the stators includes a first stator, a second stator, and a third stator; each of the stators comprises at least one stator coil, and the directions of magnetic fields generated by the stator coils are orthogonal; and the rotor comprises a magnetic element, a first bearing, a second bearing, and a shaft.

The stators produce a superimposed magnetic field that enables the magnetic element to rotate; when the magnetic element rotates in a first plane, an outer ring of the first bearing rotates synchronously; the center of the first bearing is located in the plane where the second bearing is located, and an inner ring of the second bearing rotates synchronously when the magnetic element rotates in a second plane. The center axis of the shaft penetrates through the center of the first bearing.

Wherein, the shaft is rotatably fixed to the first bearing and is connected with the second bearing; the magnetic element is located at the intersection of the center axis of the first bearing and the center axis of the second bearing; and a normal vector of the first plane is parallel to an axial direction of the shaft, and a normal vector of the second plane is perpendicular to the axial direction of the shaft.

In one embodiment, the motor further comprises a fixing structure located in a first space and having an internal space, and the rotor is located in the internal space; and the second bearing abuts against the fixing structure, so that the first stator, the second stator or the third stator does not directly make contact with the second bearing.

In one embodiment, the fixing structure is a hexahedron, and the stators are disposed in the fixing structure; a connection line between the stator coils of the first stator is a first axis, a connection line between the stator coils of the second stator is a second axis, and a connection line between the stator coils of the third stator is a third axis; the first axis, the second axis, and the third axis are orthogonal to one another.

In one embodiment, the stator coils of the stators are printed circuit board stator coils.

In one embodiment, the rotor further comprises a rotor housing covering the magnetic element.

In one embodiment, the rotor housing comprises a first housing and a second housing, wherein the first and second housings are detachably combined to form a spherical appearance, an opening is formed at the joint of the first housing and second housing, and the shaft abuts against the opening.

In one embodiment, the rotor housing is magnetic.

In one embodiment, the magnetic element is a permanent magnet.

In one embodiment, the motor is driven by a drive circuit comprising a power output unit, a system control circuit, a full bridge circuit, a Hall element, an electrical measurement unit, and a microcontroller.

In order to make the motor work, the drive circuit of the motor is disclosed below.

In this disclosure, the three-phase full bridge circuit of the drive motor is connected to the system control circuit and is also connected with the first stator, the second stator, and the third stator; the stator coils of the first stator are connected; the stator coils of the second stator are connected; and the stator coils of the third stator are connected.

In one embodiment, the Hall element is used to sense the rotation angle of the rotor in each dimension.

In one embodiment, the electrical measurement unit is connected with the full bridge circuit.

In one embodiment, the microprocessor is connected with the system control circuit and the electrical measurement unit.

As mentioned above, according to the motor of this disclosure, the superimposed magnetic field is provided from the outside of the rotor by the three stators having the central axes orthogonal to one another to enable the motor to rotate in multiple dimensions, so that an extra drive part is not needed.

Compared to conventional motors, machines can perform multi-dimensional operations through only one motor of the disclosure, and thus, the weight of machines and the environmental burden are dramatically reduced.

In addition to the motor and the drive circuit thereof, this disclosure also discloses a driving method for driving the motor.

The driving method for driving the motor comprises: sending, by the computer unit, a preset rotation direction instruction and a rotation speed instruction to the microprocessor; sensing, by the Hall element, a rotation angle of the rotor to obtain rotation angle data, and measuring, by the electrical measurement unit, an electrical characteristic (for instance, but not limited to, a current or voltage) across the stators to obtain electrical data; automatically transmitting the rotation angle data and the electrical data to the microprocessor; obtaining a digital electrical signal by the microprocessor through conversion according to the preset rotation angle instruction, the preset rotation speed instruction, the rotation angle data and the electrical data; obtaining corrected electrical data by the microprocessor through calculation according to the digital electrical signal, the preset rotation direction instruction and the preset rotation speed instruction; and transmitting the corrected electrical data to the power output unit by the microprocessor, so that the power output unit outputs an appropriate current or voltage to adjust the magnetic field strength of the stators and the direction of the superimposed magnetic field, thereby changing the rotation direction or speed of the rotor.

DETAILED DESCRIPTION OF THE INVENTION

The method and the drive circuit and driving method of the same in the preferred embodiments of this disclosure are described below with reference to the relevant drawings, and identical components are explained with identical reference signals.

It is important to note that all directional terms in the embodiments of this disclosure (such as upper, lower, left, right, front, and back) are used only to explain the relative positional relationship, movement condition, and the like between components in a particular state (as shown in the accompanying drawings), and if the particular state changes, the directional terms will change accordingly.

The motor 1 in this embodiment may be applied to, but is not limited to, machines such as vehicles, small satellites, unmanned underwater vehicles, and unmanned aerial vehicles.

As shown in FIGS. 1-3 and 5, the motor 1 in this disclosure comprises stators 12(see FIG. 5, stators 12 means that all the stator coils for example there are 121a, 121b, 122a, 122b,123a, and 123b) and a rotor 11. The stators 12 include a first stator 121(means that the couple of stator coils for example there are 121a, and 121b), a second stator 122(means that the couple of stator coils for example there are 122a, and 122b), and a third stator 123(means that the couple of stator coils for example there are 123a, and 123b), and each stator 12 comprises at least two stator coils.

In other embodiments, a connection line of the centers of the stator coils (121a and 121b) of the first stator 121 is a first axis, a connection line of the centers the stator coils (122a and 122b) of the second stator 122 is a second axis, and a connection line of the centers of the stator coils (123a and 123b) of the third stator 123 is a third axis. The first axis, the second axis, and the third axis are orthogonal to one another.

In particular, because the first axis, the second axis, and the third axis are orthogonal to one another, and according to the principle of superposition, the motor 1 in this disclosure is able to rotate in any direction in a three-dimensional space without being limited by angle.

Figure 1:
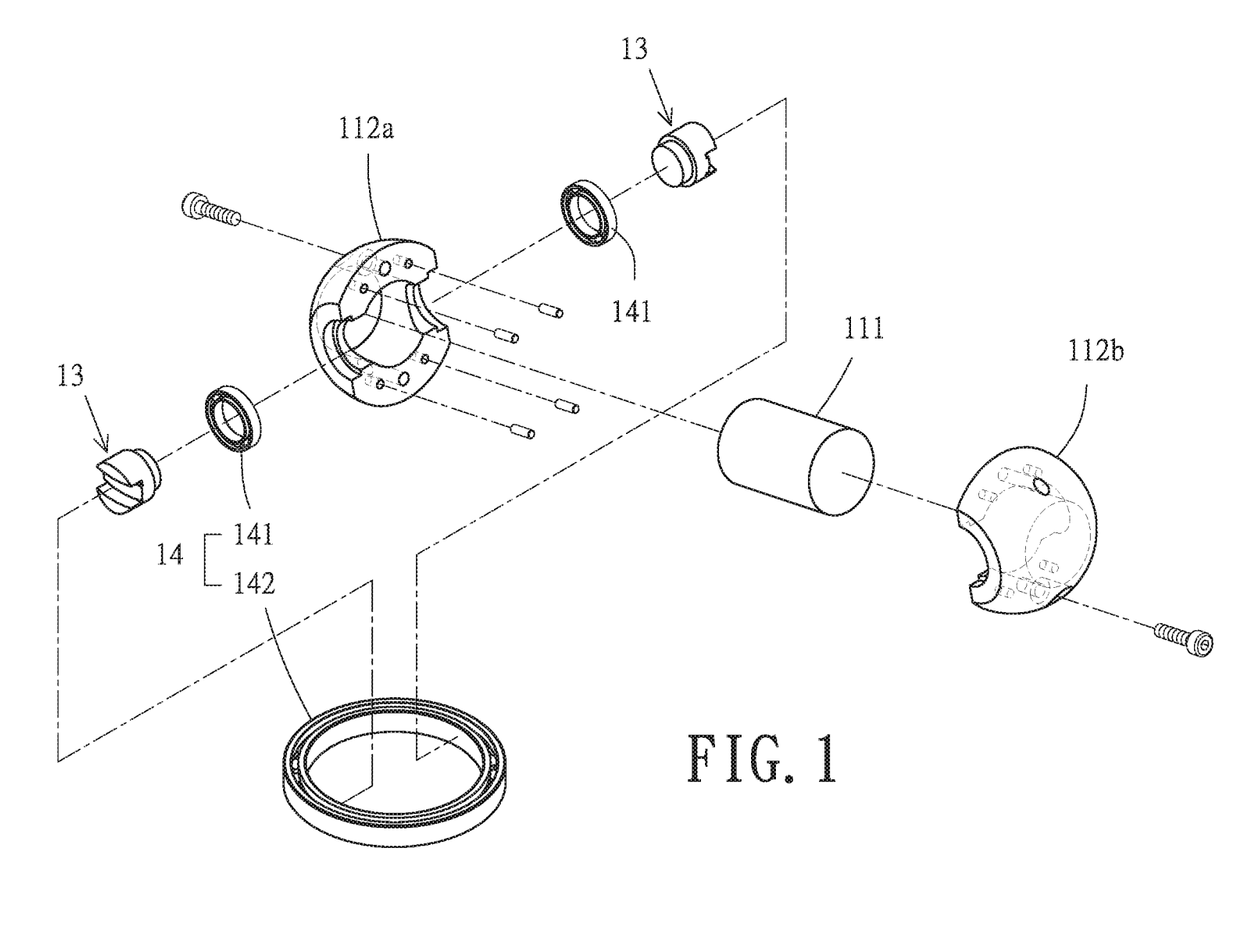
FIG. 1 is a diagram of a rotor in one embodiment of this disclosure.
Figure 2:
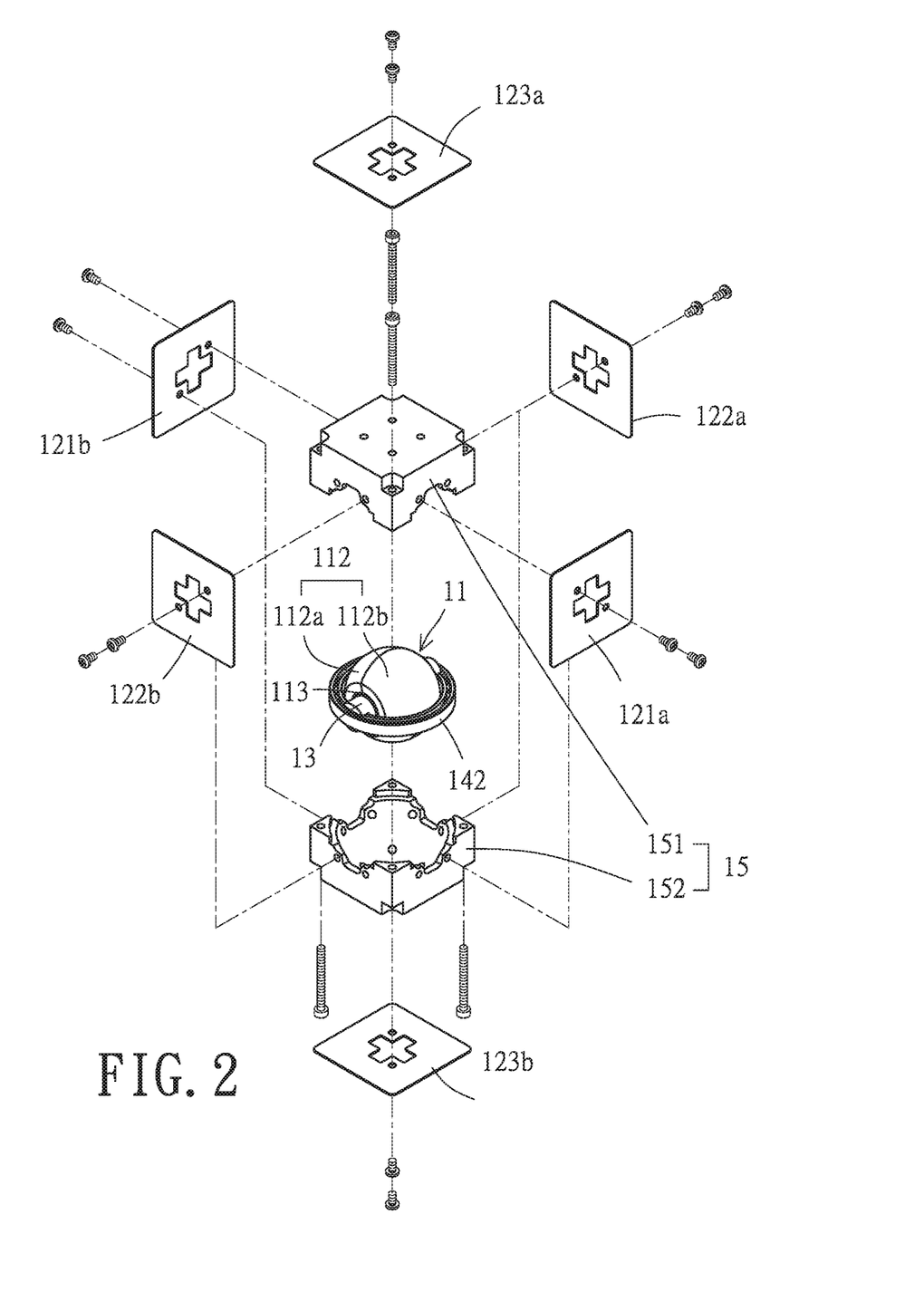
FIG. 2 is an exploded view of a motor in one embodiment of this disclosure.
Figure 4:
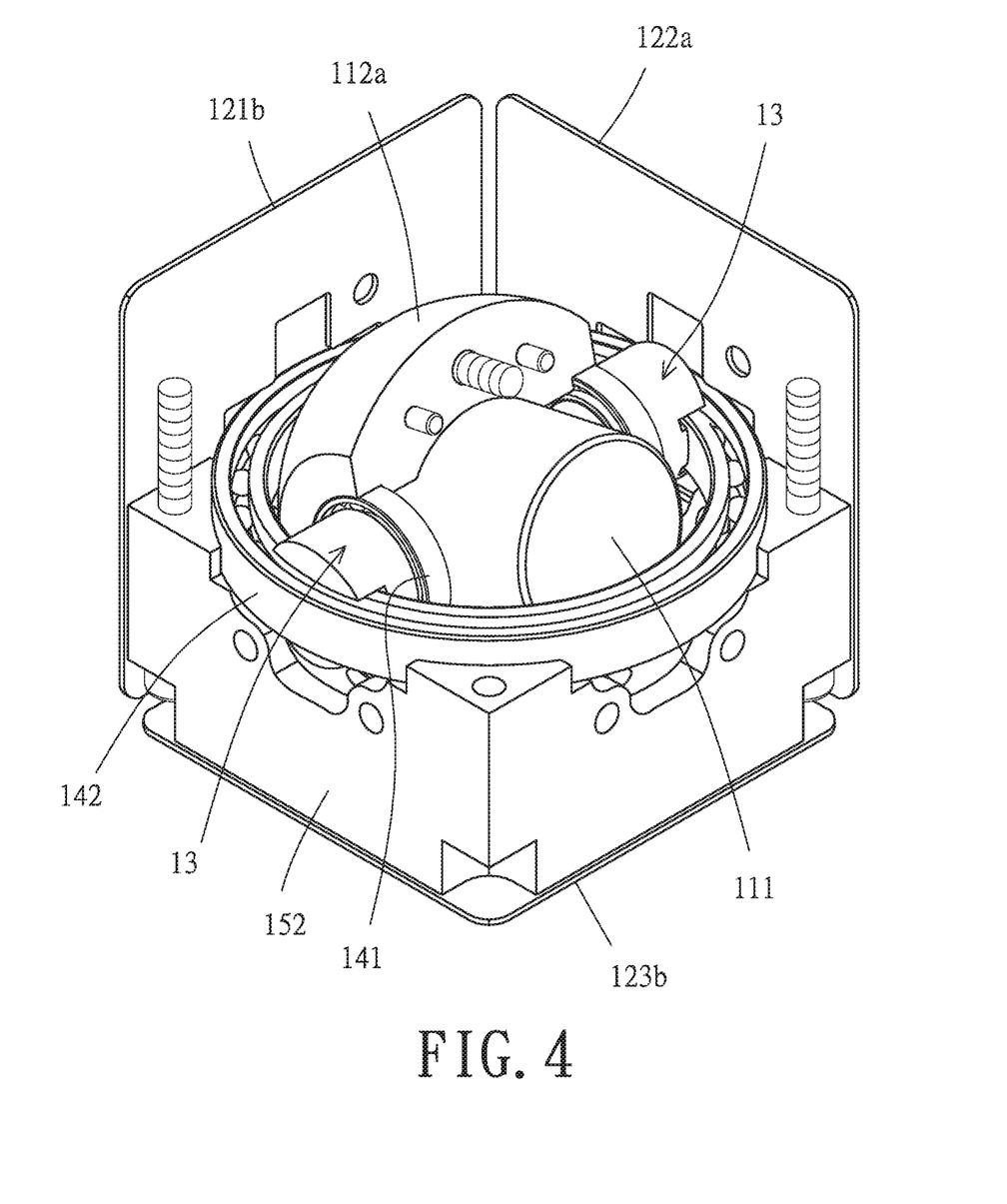
FIG. 4 is an assembled diagram of local components in one embodiment of the disclosure.

As shown in FIG. 1-2 and FIG. 4, the rotor 11 comprises a magnetic element 111 (such as, but not limited to, a permanent magnet), a first bearing 141 (for example there are two bearings), a second bearing 142 (for example there are one bearing), and a shaft 13. When the stators 12 produce a superimposed magnetic field, the magnetic element 111 rotates under the effect of the superimposed magnetic field.

In this embodiment, the shaft 13 penetrates through the first bearing 141 to be rotatably fixed to the inner ring of the first bearing 141; one end of the shaft 13 abuts against the inner ring of the second bearing 142 to be rotatably fixed to the second bearing 142.

The magnetic element 111 is located at the intersection of the central axis of the first bearing 141 and the central axis of the second bearing 142, the normal vector of a first plane is parallel to the axis of the shaft 13, and the normal vector of a second plane is perpendicular to the axis of shaft 13.

The outer ring of the first bearing 141 rotates synchronously when the magnetic element 111 rotates in the first plane.

The center of the first bearing 141 is located in the plane where the second bearing 142 is located, and the inner ring of the second bearing 142 rotates synchronously when the magnetic element 111 rotates in the second plane.

Figure 5:
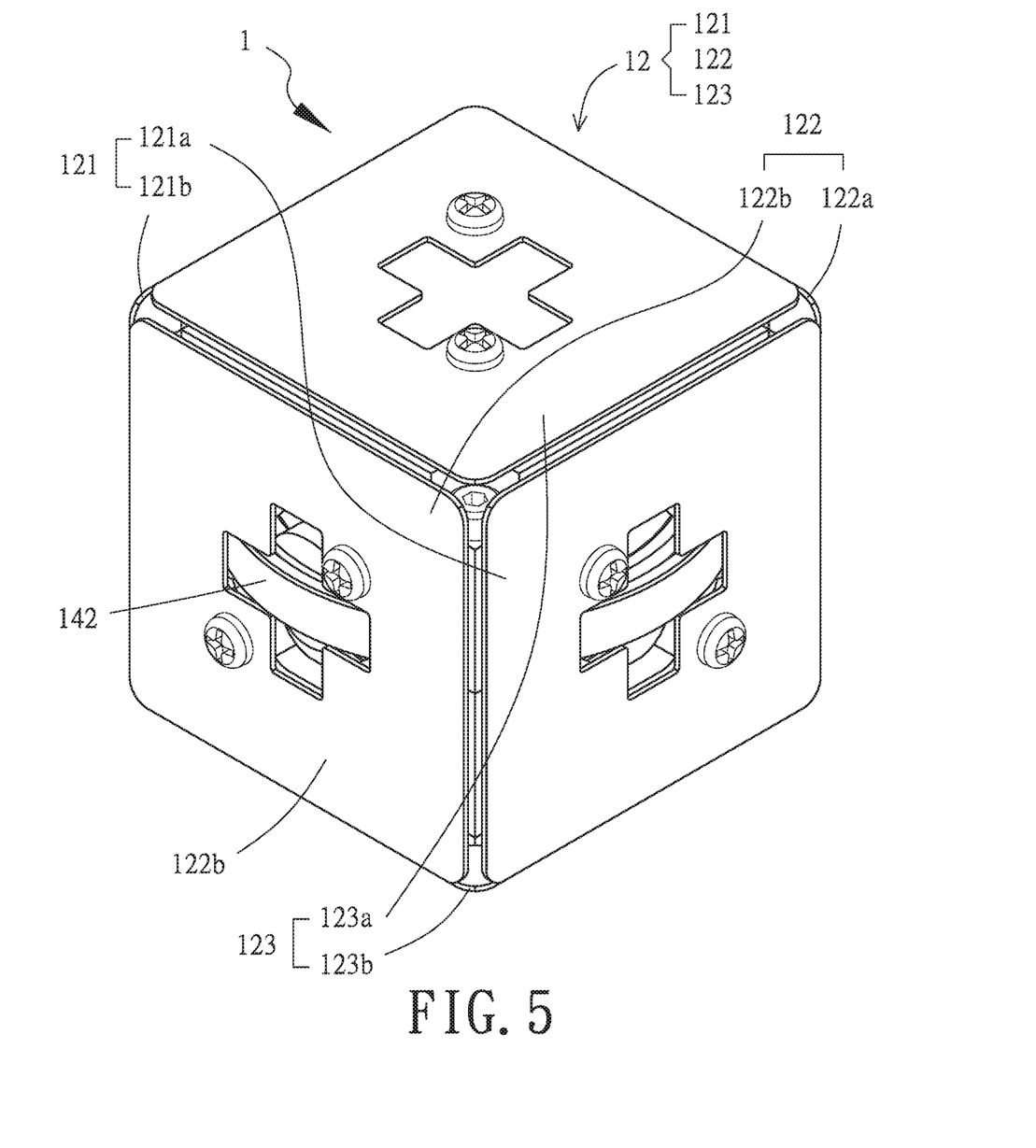
FIG. 5 is an overall assembled diagram of the motor in one embodiment of this disclosure.

As shown in FIG. 2, 4-5, a first space is defined by the stators 12 (see FIG. 4, for instance, there is the cube space formed by stator coils 122a, 121b 123b), and the magnetic element 111 is disposed in the first space.

As shown in FIG. 1-2, the motor 1 in this disclosure also comprises rotor housing 112 (means that the first housing 112a and the second housing 112b), the rotor housing 112 consists of a first housing 112a and a second housing 112b, the first housing 112a and the second housing 112b are each provided with a groove to form a bowl structure, and the magnetic element 111 is firmly embedded in the grooves. The first housing 112a and the second housing 112b are detachably combined to form a spherical appearance, and the magnetic element 111 is closely wrapped between the first housing 112a and the second housing 112b of the rotor housing 112. Because the magnetic element 111 is firmly wrapped in the rotor housing 112, the rotor housing 112 rotates synchronously along with the magnetic element 111 instead of rotating relative to the magnetic element 111. An opening 113 is formed when the first housing 112a and the second housing 112b are combined, the first bearing 141 is embedded in the opening 113, and the shaft 13 penetrates through the first bearing 141.

In other embodiments, the motor 1 is used as a momentum wheel, and the rotor 11 in the momentum wheel usually requires a large rotational inertia to achieve rotation of external machines based on the principle of angular momentum conservation. The rotational inertia of the rotor 11 can be increased through the configuration of the rotor housing 112, and the rotor housing 112 is made from, but not limited to, ferromagnetic materials containing iron.

In this embodiment, two ends of the shaft 13 are fixedly connected to the inner ring of the second bearing 142, so that the shaft 13 is able to rotate in the second plane where the second bearing 142 is located.

Figure 3:
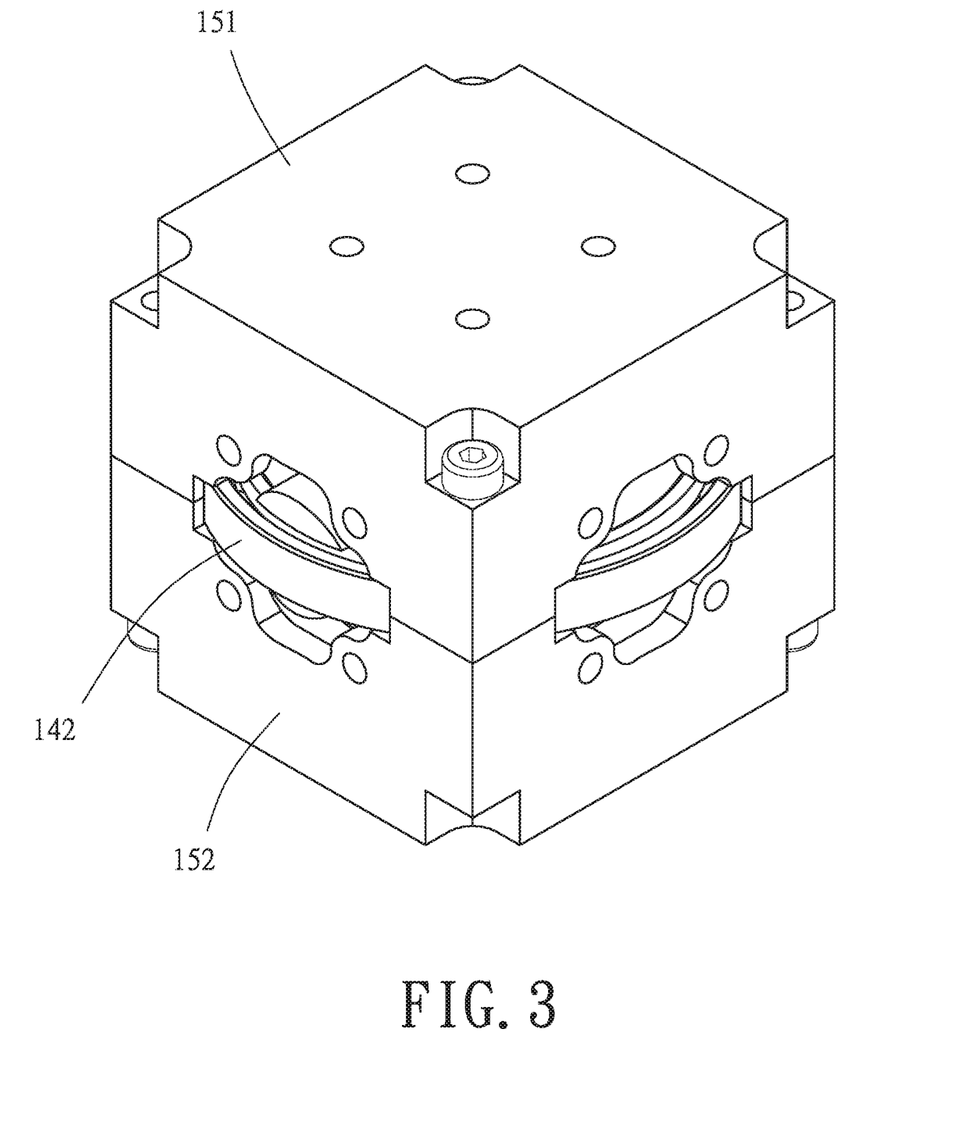
FIG. 3 is a diagram of the rotor and fixing structure in one embodiment of this disclosure.

As shown in FIGS. 2-3, the motor 1 in this disclosure also comprises a fixing structure 15 located in the first space, wherein the fixing structure 15 is, but not limited to, a regular hexahedron and consists of a first fixing structure 151 and a second fixing structure 15, and the first fixing structure and the second fixing structure each have a bowl-shaped recessed part. When the first fixing structure 151 and the second fixing structure 15 are combined correspondingly, the recessed parts form an internal space, so that the rotor 11 is disposed in the first space and secured by the fixing structure 15.

However, it should be noted in particular that because the motor 1 operates based on the principle of angular momentum conservation, the inner ring of the second bearing 142 does not make contact with the fixing structure 15 in the optimum embodiment.

As shown in FIGS. 4-5, the second bearing 142 abuts against the fixing structure 15, and the stator coils are disposed outside the fixing structure 15 and are securely locked on the fixing structure 15, so that the first stator 121, the second stator 122, or the third stator 123 does not directly make contact with the second bearing 142, and air gaps are reserved between the rotor 11 and the stator coils.

In other embodiments, the stator coils can be, but are not limited to, flexible PCB stator coils, wherein a hole which is in, but not limited to, a linear shape or a crossed shape is formed in the middle of each flexible PCB stator coil, so that the second bearing 142 can penetrate through the flexible PCB stator coils to reduce the size of the motor 1.

Figure 6:
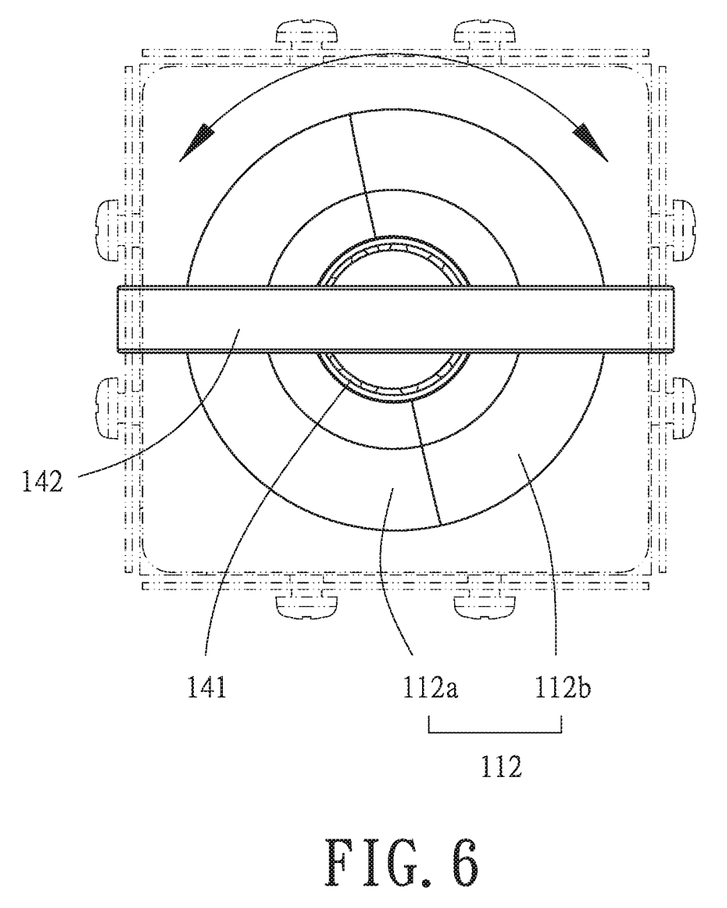
FIG. 6 is a rotating diagram of the rotator in a first plane in one embodiment of the disclosure.

As shown in FIGS. 4-6, the stators 12 (means that all the stator coils for example there are 121a, 121b, 122a, 122b, 123a, and 123b) produce a superimposed magnetic field that enables the magnetic element 111 to rotate, and through the configuration of the first bearing 141, the rotor 11 is able to rotate with the shaft 13 as the axis.

Figure 7:
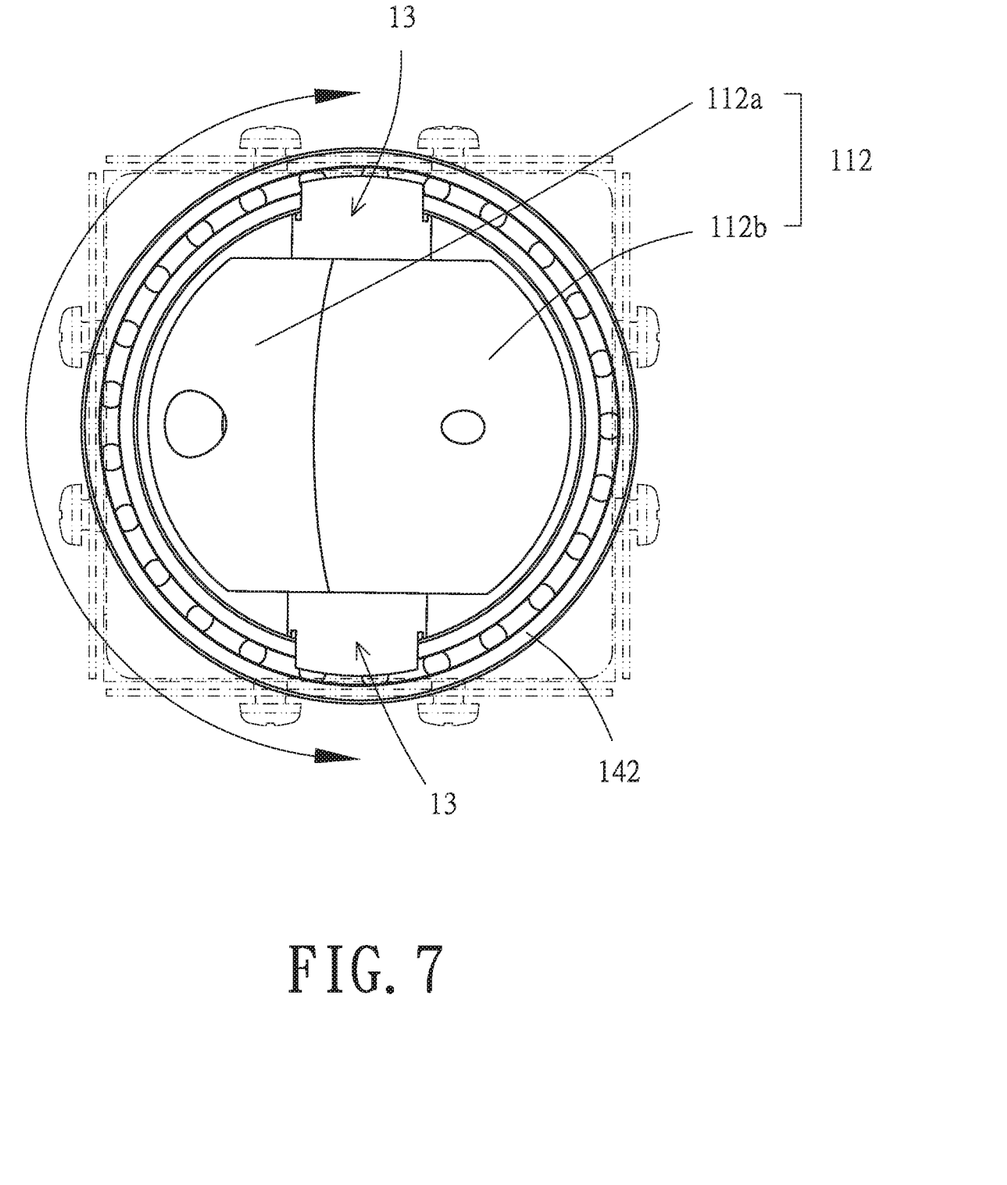
FIG. 7 is a rotating diagram of the rotor in a second plane in one embodiment of the disclosure.

As shown in FIGS. 4-5 and 7, the stators 12 (means that all the stator coils for example there are 121a, 121b, 122a, 122b, 123a, and 123b) produce a superimposed magnetic field that enables the magnetic element 111 to rotate, and through the configuration of the second bearing 142, the rotor 11 is able to rotate in the second plane.

As shown in FIGS. 4, and 6-7, the stators 12 (means that all the stator coils for example there are 121a, 121b, 122a, 122b, 123a, and 123b) produce a superimposed magnetic field that enables the magnetic element 111 to rotate, and through the configuration of the first bearing 141 and the second bearing142, the rotor 11 is able to rotate with the shaft 13 as the axis and is able to rotate in the second plane.

Figure 8:
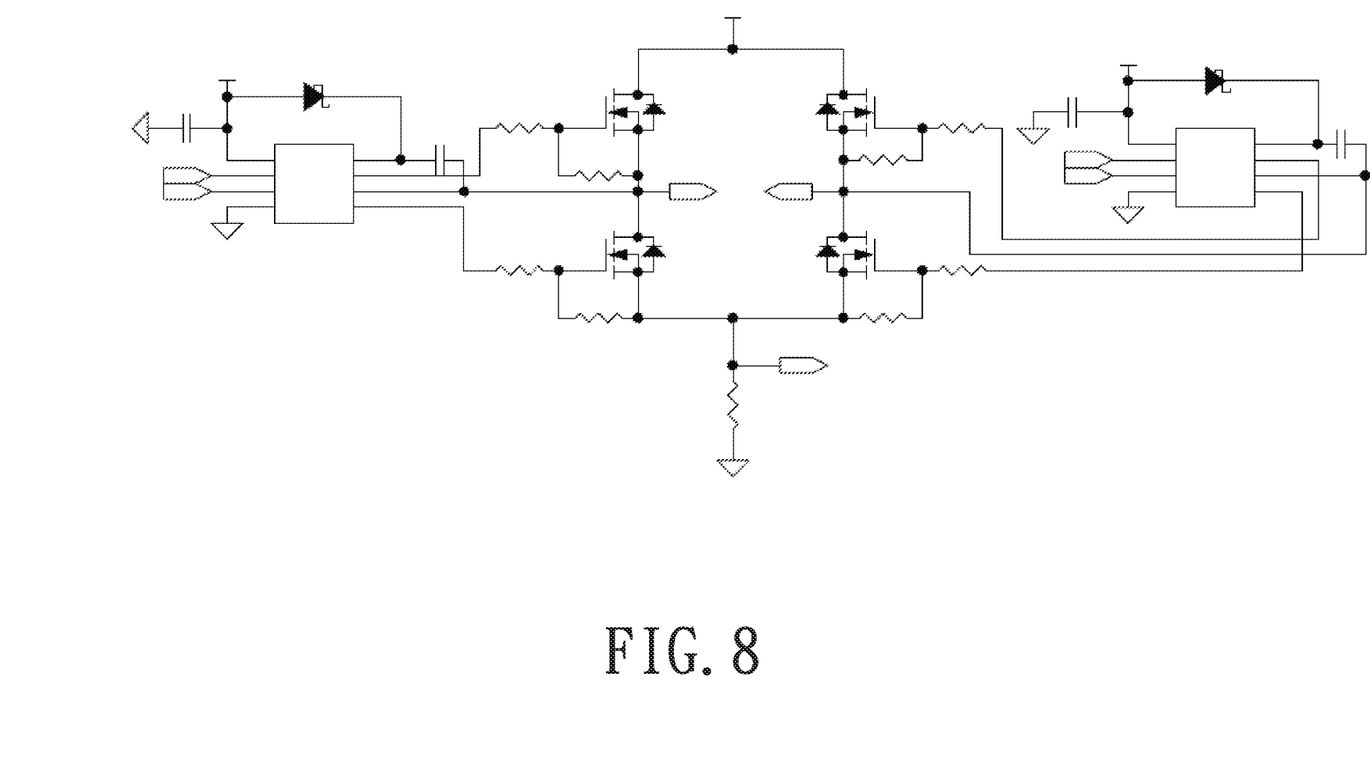
FIG. 8 is a schematic diagram of a drive circuit for driving the motor in one embodiment of the disclosure.

In particular, each stator 12 (means that the couple of stator coils for example the first stator 121, the second stator 122 or the third stator 123) is connected to points A in a full bridge circuit (see FIG. 8). In this embodiment, there are three stators 12 (the first stator 121, the second stator 122, and the third stator 123), the two stator coils of each stator 12 are connected between the points A in one full bridge circuit and connected (for instance, but not limited to, in series or in parallel).

Therefore, opposite magnetic fields are generated by each stator 12. That is to say, in a three-dimensional coordinate system, the stators 12 can produce positive and negative magnetic fields in the X, Y, and Z axes, respectively, and components of the magnetic fields produced by the stators 12 in the X, Y, and Z axes are superposed to obtain any direction in the three-dimensional space. Thus, the rotor 11 can rotate freely in the three-dimensional space.

Figure 9:
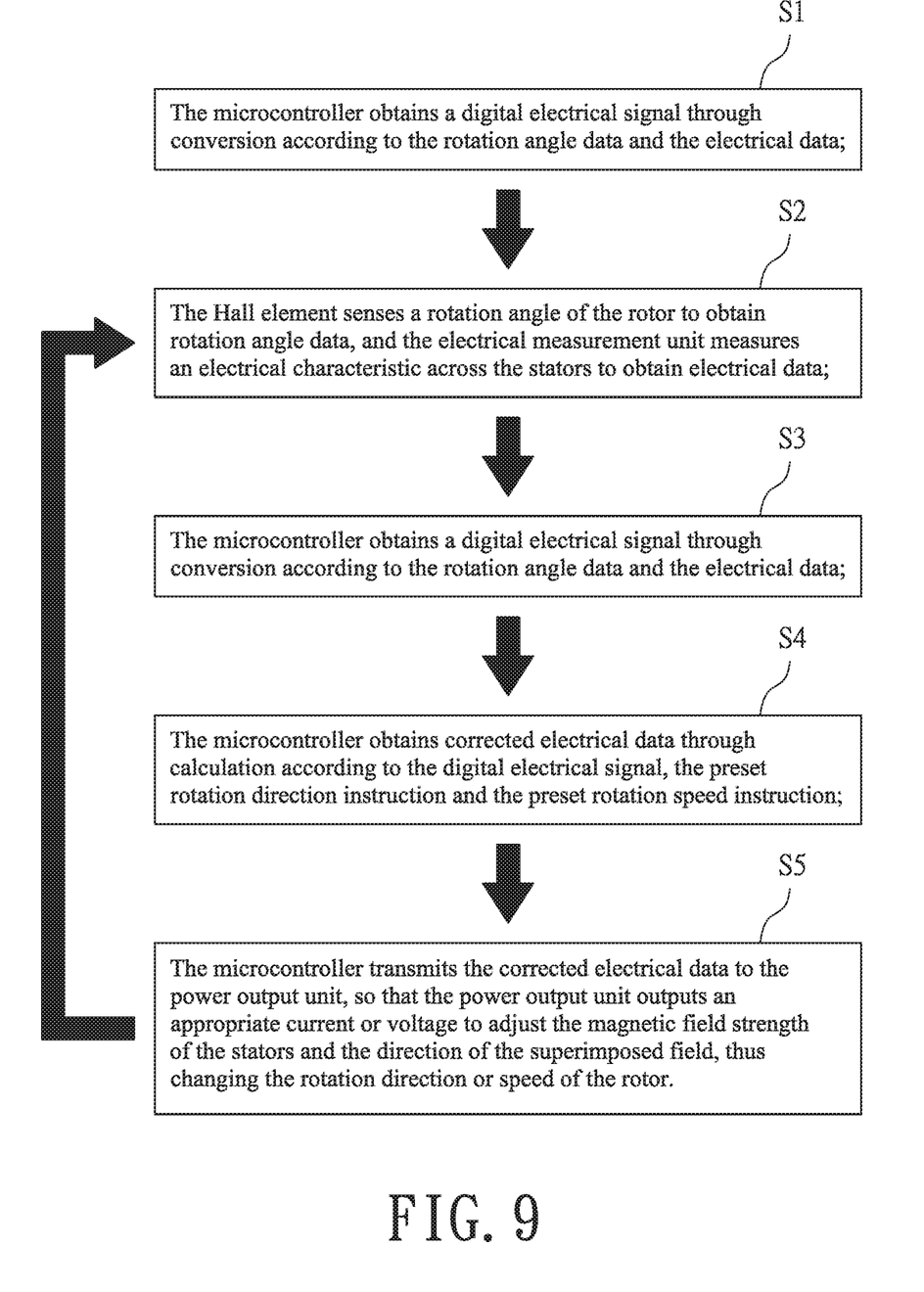
FIG. 9 is a flow diagram of the driving method for driving the motor in one embodiment of the disclosure.

As shown in FIG. 9, in order to drive the motor 1 of this embodiment, automatic control can be conducted according to induction data. The driving method for driving the motor 1 in this embodiment comprises: a computer unit, which sends a preset rotation direction instruction and a preset rotation speed instruction; a Hall element, which senses the rotation angle of the rotor 11 (for instance, but not limited to, the angle between the rotation direction and an X, Y, or Z axis, and the X, Y, and Z axes are orthogonal directions in a three-dimensional space) to obtain rotation angle data; an electrical measurement unit, which measures an electrical characteristic such as a voltage or current across the stators 12 (for instance, but not limited to, a voltmeter or a current meter) to obtain electrical data (for instance, but not limited to the voltage or current). The rotation angle data and the electrical data are automatically transmitted to a microcontroller (MCU), and a digital electrical signal is obtained by the microcontroller through conversion according to the rotation angle data and the electrical data.

The microcontroller obtains corrected electrical data (for instance, but not limited to a corrected voltage or a corrected current) by calculation according to the digital electrical signal, the preset rotation direction instruction and the preset rotation speed instruction; the microcontroller transmits the corrected electrical data to a power output unit, so that the power output unit outputs an appropriate current or voltage to adjust the magnetic field strength of the stators 12 and the direction of the superimposed magnetic field, thus changing the rotation direction or speed of the rotor 11.

In summary, according to the motor 1 and the drive circuit and method for driving the motor 1, the stators 12 having the central axes orthogonal to one another are driven by the driving method for driving the motor to enable the rotor 11 disposed in the rotators 12 to rotate in a three-dimensional space without angle limitations, so that the motor 1 can be controlled in over two dimensions. Thus, the weight of machines and the environmental burden are reduced, and the technical defect that the motor 1 can rotate in only one dimension is overcome.

The above embodiment is illustrative only, and is not restrictive. Any equivalent amendments or changes to the above embodiment without deviating from the spirit and scope of this disclosure should also fall within the scope of the patent application attached.

What is claimed is:
1. A motor comprising:
stators including:
a first stator, a second stator, and a third stator, each comprising at least one stator coil generating magnetic fields in orthogonal directions;
a rotor comprising:
a magnetic element which rotates in a resultant force direction under the effect of a superimposed magnetic field produced by the stators;
a first bearing having an outer ring rotating synchronously when the magnetic element rotates in a first plane;
a second bearing having a center located on a plane where the second bearing is located and an inner ring rotating synchronously when the magnetic element rotates in a second plane; and
a shaft having a central axis penetrating through the center of the first bearing;

wherein, the shaft is rotatably fixed to the first bearing and is connected with the second bearing, the magnetic element is located at an intersection of a central axis of the first bearing and a central axis of the second bearing, and a normal vector of the first plane is parallel to an axial direction of the shaft; and a normal vector of the second plane is perpendicular to the axial direction of the shaft.

2. The motor according to claim 1, wherein, the motor further comprises:
a fixing structure located in a first space and having an internal space, wherein the rotor is located in the internal space; and the second bearing abuts against the fixing structure, so that the first stator, the second stator or the third stator does not directly make contact with the second bearing directly.

3. The motor according to claim 2, wherein each of the stators comprises at least two stator coils and is disposed in a fixing structure which is a hexahedron, and six sides of the hexahedron are each provided with at least one said stator coil; a connection line of the stator coils of the first stator is a first axis, a connection line of the stator coils of the second stator is a second axis, and a connection line of the stator coils of the third stators is a third axis; and the first axis, the second axis and the third axis are orthogonal to one another.

4. A drive circuit for driving the motor according to claim 3 comprising:
a computer unit;
a power output unit;
a system control circuit;
a three-phase full bridge circuit connected with the system control circuit and also connected with the first stator, the second stator, and the third stator, wherein the stator coils of the first stator are connected, the stator coils of the second stator are connected, and the stator coils of the third stator are connected;
a Hall element used for to sense a rotation angle of the rotor in each dimension;
an electrical measurement unit connected with the full bridge circuit; and
a microcontroller connected with the system control circuit and the electrical measurement unit.

5. A driving method using the drive circuit according to claim 4, comprising:
sending, by the computer unit, a preset rotation direction instruction and a rotation speed instruction to the microprocessor;
sensing, by the Hall element, a rotation angle of the rotor to obtain rotation angle data, and measuring, by the electrical measurement unit, an electrical characteristic across the stators to obtain electrical data;
obtaining a digital electrical signal by the microprocessor through conversion according to the rotation angle data and the electrical data;
obtaining corrected electrical data by the microprocessor through calculation according to the digital electrical signal, the preset rotation direction instruction and the preset rotation speed instruction; and
transmitting the corrected electrical data to the power output unit by the microprocessor, so that the power output unit outputs an appropriate current or voltage to adjust the magnetic field strength of the stators and the direction of the superimposed magnetic field, thereby changing the rotation direction or speed of the rotor.

6. A drive circuit for driving the motor according to claim 2 comprising:
a computer unit;
a power output unit;
a system control circuit;
a three-phase full bridge circuit connected with the system control circuit and also connected with the first stator, the second stator, and the third stator, wherein the stator coils of the first stator are connected, the stator coils of the second stator are connected, and the stator coils of the third stator are connected;
a Hall element used for to sense a rotation angle of the rotor in each dimension;
an electrical measurement unit connected with the full bridge circuit; and
a microcontroller connected with the system control circuit and the electrical measurement unit.

7. A driving method using the drive circuit according to claim 6, comprising:
sending, by the computer unit, a preset rotation direction instruction and a rotation speed instruction to the microprocessor;
sensing, by the Hall element, a rotation angle of the rotor to obtain rotation angle data, and measuring, by the electrical measurement unit, an electrical characteristic across the stators to obtain electrical data;
obtaining a digital electrical signal by the microprocessor through conversion according to the rotation angle data and the electrical data;
obtaining corrected electrical data by the microprocessor through calculation according to the digital electrical signal, the preset rotation direction instruction and the preset rotation speed instruction; and
transmitting the corrected electrical data to the power output unit by the microprocessor, so that the power output unit outputs an appropriate current or voltage to adjust the magnetic field strength of the stators and the direction of the superimposed magnetic field, thereby changing the rotation direction or speed of the rotor.

8. The motor according to claim 1, wherein the stator coils are printed circuit board stator coils.

9. A drive circuit for driving the motor according to claim 8 comprising:
a computer unit;
a power output unit;
a system control circuit;
a three-phase full bridge circuit connected with the system control circuit and also connected with the first stator, the second stator, and the third stator, wherein the stator coils of the first stator are connected, the stator coils of the second stator are connected, and the stator coils of the third stator are connected;
a Hall element used for to sense a rotation angle of the rotor in each dimension;
an electrical measurement unit connected with the full bridge circuit; and
a microcontroller connected with the system control circuit and the electrical measurement unit.

10. A driving method using the drive circuit according to claim 9, comprising:
sending, by the computer unit, a preset rotation direction instruction and a rotation speed instruction to the microprocessor;
sensing, by the Hall element, a rotation angle of the rotor to obtain rotation angle data, and measuring, by the electrical measurement unit, an electrical characteristic across the stators to obtain electrical data;
obtaining a digital electrical signal by the microprocessor through conversion according to the rotation angle data and the electrical data;

obtaining corrected electrical data by the microprocessor through calculation according to the digital electrical signal, the preset rotation direction instruction and the preset rotation speed instruction; and transmitting the corrected electrical data to the power output unit by the microprocessor, so that the power output unit outputs an appropriate current or voltage to adjust the magnetic field strength of the stators and the direction of the superimposed magnetic field, thereby changing the rotation direction or speed of the rotor.

11. The motor according to claim 1, wherein the rotor further comprises:

a rotor housing that covers the magnetic element.

12. The motor according to claim 11, wherein the rotor housing consists of a first housing and a second housing which are detachably combined to form a spherical appearance, an opening is formed at a joint of the first housing and second housing, and the shaft abuts against the opening.

13. A drive circuit for driving the motor according to claim 12 comprising:

a computer unit;

a power output unit;

a system control circuit;

a three-phase full bridge circuit connected with the system control circuit and also connected with the first stator, the second stator, and the third stator, wherein the stator coils of the first stator are connected, the stator coils of the second stator are connected, and the stator coils of the third stator are connected;

a Hall element used for to sense a rotation angle of the rotor in each dimension;

an electrical measurement unit connected with the full bridge circuit; and a microcontroller connected with the system control circuit and the electrical measurement unit.

14. The motor according to claim 11, wherein the rotor housing is strongly magnetic.

15. A drive circuit for driving the motor according to claim 14 comprising:

a computer unit;

a power output unit;

a system control circuit;

a three-phase full bridge circuit connected with the system control circuit and also connected with the first stator, the second stator, and the third stator, wherein the stator coils of the first stator are connected, the stator coils of the second stator are connected, and the stator coils of the third stator are connected;

a Hall element used for to sense a rotation angle of the rotor in each dimension;

an electrical measurement unit connected with the full bridge circuit; and a microcontroller connected with the system control circuit and the electrical measurement unit.

16. A drive circuit for driving the motor according to claim 11 comprising:

a computer unit;

a power output unit;

a system control circuit;

a three-phase full bridge circuit connected with the system control circuit and also connected with the first stator, the second stator, and the third stator, wherein the stator coils of the first stator are connected, the stator coils of the second stator are connected, and the stator coils of the third stator are connected;

a Hall element used for to sense a rotation angle of the rotor in each dimension;

an electrical measurement unit connected with the full bridge circuit; and a microcontroller connected with the system control circuit and the electrical measurement unit.

17. The motor according to claim 1, wherein the magnetic element is a permanent magnet.

18. A drive circuit for driving the motor according to claim 17 comprising:

a computer unit;

a power output unit;

a system control circuit;

a three-phase full bridge circuit connected with the system control circuit and also connected with the first stator, the second stator, and the third stator, wherein the stator coils of the first stator are connected, the stator coils of the second stator are connected, and the stator coils of the third stator are connected;

a Hall element used for to sense a rotation angle of the rotor in each dimension;

an electrical measurement unit connected with the full bridge circuit; and a microcontroller connected with the system control circuit and the electrical measurement unit.

19. A drive circuit for driving the motor according to claim 1 comprising:

a computer unit;

a power output unit;

a system control circuit;

a three-phase full bridge circuit connected with the system control circuit and also connected with the first stator, the second stator, and the third stator, wherein the stator coils of the first stator are connected, the stator coils of the second stator are connected, and the stator coils of the third stator are connected;

a Hall element used for to sense a rotation angle of the rotor in each dimension;

an electrical measurement unit connected with the full bridge circuit; and a microcontroller connected with the system control circuit and the electrical measurement unit.

20. A driving method using the drive circuit according to claim 19, comprising:

sending, by the computer unit, a preset rotation direction instruction and a rotation speed instruction to the microprocessor;

sensing, by the Hall element, a rotation angle of the rotor to obtain rotation angle data, and measuring, by the electrical measurement unit, an electrical characteristic across the stators to obtain electrical data;

obtaining a digital electrical signal by the microprocessor through conversion according to the rotation angle data and the electrical data;

obtaining corrected electrical data by the microprocessor through calculation according to the digital electrical signal, the preset rotation direction instruction and the preset rotation speed instruction; and transmitting the corrected electrical data to the power output unit by the microprocessor, so that the power output unit outputs an appropriate current or voltage to adjust the magnetic field strength of the stators and the direction of the superimposed magnetic field, thereby changing the rotation direction or speed of the rotor.

* * * * *